May 4, 1965   A. A. FREISTAT   3,181,693
CARRYING CASE INSERT FORMED WITH LOCKED-IN
POLYURETHANE FOAM
Filed Dec. 18, 1963   4 Sheets-Sheet 1
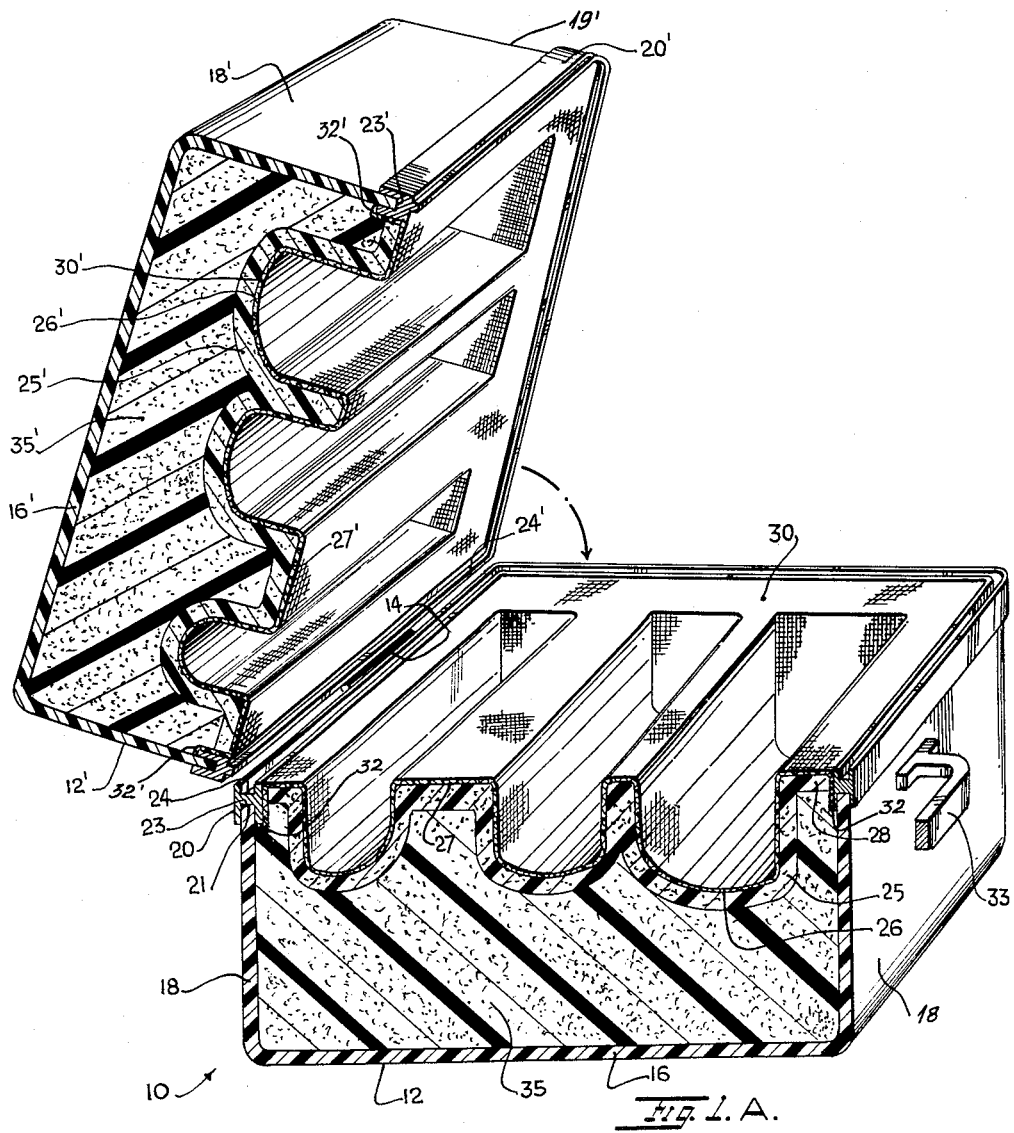
Fig. 1.A.
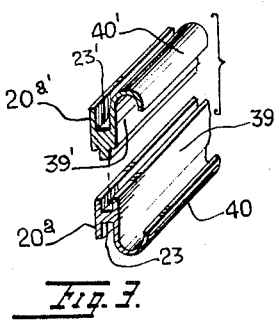
Fig. 3.
INVENTOR.
ALFRED A. FREISTAT
BY
Polachek & Saulsbury
ATTORNEYS May 4, 1965 A. A. FREISTAT 3,181,693
CARRYING CASE INSERT FORMED WITH LOCKED-IN
POLYURETHANE FOAM
Filed Dec. 18, 1963 4 Sheets-Sheet 2

INVENTOR.
Alfred A. Freistat
BY
Polachek & Saulsbury
ATTORNEYS.

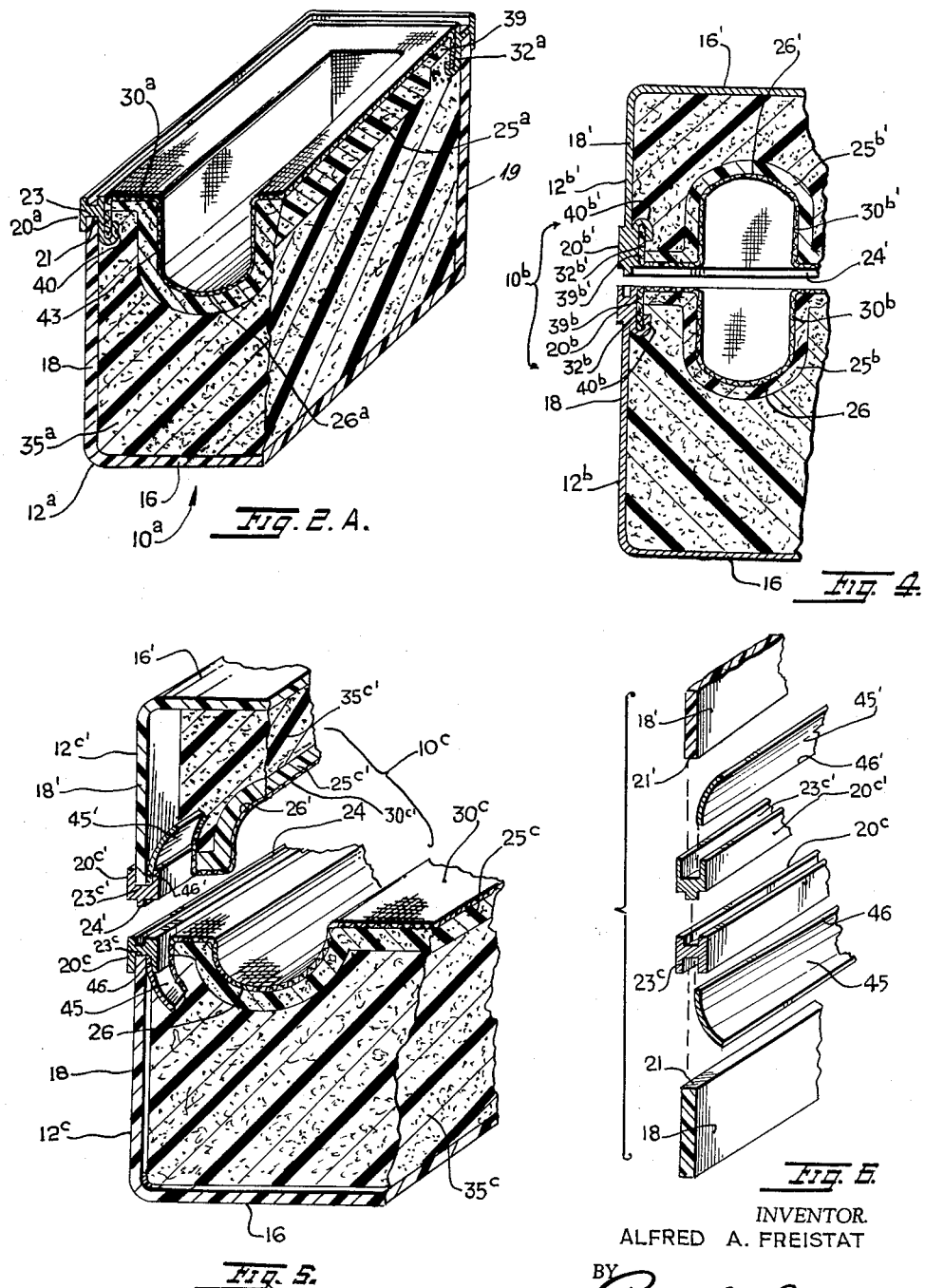

May 4, 1965  A. A. FREISTAT  3,181,693
CARRYING CASE INSERT FORMED WITH LOCKED-IN
POLYURETHANE FOAM
Filed Dec. 18, 1963  4 Sheets-Sheet 4

INVENTOR.
ALFRED A. FREISTAT
BY
*Polochek & Saulsbury*
ATTORNEYS

United States Patent Office 3,181,693
Patented May 4, 1965

3,181,693
CARRYING CASE INSERT FORMED WITH
LOCKED-IN POLYURETHANE FOAM
Alfred A. Freistat, 1348 Leonard Way,
Valley Stream, N.Y.
Filed Dec. 18, 1963, Ser. No. 331,587
8 Claims. (Cl. 206—1)

This invention relates to plastic foam fillings for fitted carrying cases used for musical instruments, jewelry, firearms, silverware, optical instruments, transistor radios, etc. The invention more particularly concerns a novel method of filling a carrying case with a foam plastic filler and of locking the filler in place in the case.

According to the invention there is provided a thin open top plastic shell to form the outer part of the body of a sectional carrying case. On the edge of the shell is mounted an extruded metal or rigid molded plastic frame. A quantity of polyurethane foam in unexpanded viscous liquid condition is placed in the shell and then a preformed plastic shell nest form covered with a fabric is mounted at the open top of the shell. The unplasticized liquid expands to form a solid set plastic foam filling in the interior of the shell. This filling engages the peripheral edge of the fabric cover at the frame. The plasticized foam when expanded and set strengthens the shell, supports the nest form and serves as a lightweight shock absorbing medium to protect articles in the case. Two complementary shells may be assembled with fillings and nest forms to form a closed carrying case for various articles. The frame on one shell may be arranged to interfit with the frame on the other shell. The fabric used for covering the nests may be felt, velvet, velour, velveteen or other cloth.

In forming the fabric covered plastic nest form, the fabric cover is applied to a nest form prior to expansion of the plastic filler. The outer peripheral edge of the fabric extends beyond edges of the nest form to form a free lip all around the nest form. It is this edge or lip of the fabric which is engaged by the plastic filler foam upon expansion of unplasticized polyurethane liquid in the shell and pressed against the frame to form a seal. The nest form may also be made of polyurethane foam.

It is therefore one object of the invention to provide a shell of a sectional case with an expanded plastic foam filling engaging the peripheral edge of a fabric cover of a preformed plastic nest form, the edge of the cover being locked to a frame around the edge of the shell.

Another object is to provide an expanded plastic foam filling in a shell of a sectional case, said shell having an extruded frame on its edge, the frame having a flange sealed to the edge of a fabric cover on a preformed plastic nest form.

A further object is to provide a novel method for filling a shell of a sectional case with expanded plastic foam and locking the filling in place.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1A is a part perspective and part sectional view of the case of FIG. 1 in open condition, on an enlarged scale.

FIG. 2A is a perspective view of a fragment of a section showing a modified form of seal between the frame and edge of the nest form cover.

FIG. 3 is a part sectional and part elevational view of the frames used with the modified form of the invention shown in FIG. 2A.

FIG. 4 is a fragmentary cross-sectional view of a case embodying another modified form of the invention.

FIG. 5 is a fragmentary part cross-sectional view and part longitudinal sectional view of a case embodying a still further modified form of the invention, the parts being shown in disassembled condition.

FIG. 6 is an exploded perspective view partially in cross section of parts of the shell body and frame assembly used in the case of FIG. 5.

Figure 1:
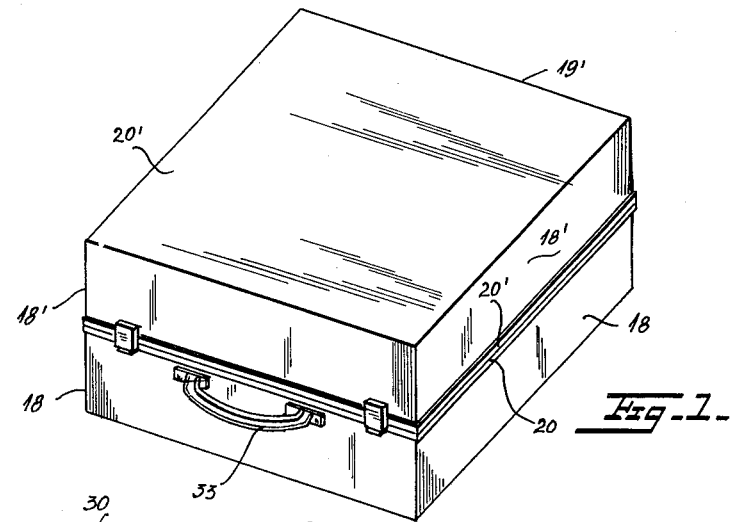
FIG. 1 is a perspective view of a carrying case embodying one form of the invention.

Referring in detail to the drawings, in FIG. 1 a sectional carrying case embodying one form of the invention is shown and designated generally by the reference numeral 9. In FIG. 1A a fragment of the case 9 is shown. Only one half of the case is shown. The half removed is identical to the half shown. The case has two sections hinged to each other as indicated at 14. One section has a shell 12 and the other section has a similar shell 12'. Shell 12 has a generally rectangular box-like form with a closed bottom 16 integral with side walls 18 and end walls 19. A molded frame 20 extends all around the periphery of the upper edge 21 of the shell 12, and a similar frame 20' extends around the bottom edge 21' of the shell 12', or the other section of the case. These frames may be of metal or plastic material. Frame 20 has a double channel structure and is H-shaped in cross section. The lower channel 23 receives and engages on the peripheral edge 21 of the shell 12. The upper channel 24 receives a ridge 24' formed at the exposed outer side of U-shaped frame 20' on shell 12', when the case is closed. Shell 12 defines a box having an open top.

The open top of the shell 12 is closed by a plastic nest form 25. This nest form is a rectangular plate-like sheet formed with indentations or recesses 26 extending longitudinally of the sheet and corresponding with the shapes of the articles to be disposed in the recesses. All the recesses extend downwardly or inwardly of the shell 12 from a flat upper plane or top 27 of the nest form and have curved bottoms. All around the periphery of the nest form there is an integrally formed laterally extending flange 28. The nest form is entirely covered on its upper side including the recesses with a suitable cloth or fabric cover 30. The cover has a free edge or lip 32 with a flange extending all around the outer edge of the flange 28. The shell 12 is filled with an expandable foam plastic filling 35. This filling engages the fabric lip 32 and presses it outwardly and upwardly against the edge of the adjacent inner vertical wall of frame 20, forming a seal thereat and holding the filling 35 in place.

The nest form, cover and filling of shell 12' is identical to that of shell 12 and corresponding parts are indicated by primed numbers. The above description of the parts of shell 12 is equally applicable to shell 12'.

When the shell 12' is closed in an inverted position over shell 12, ridge 24' of frame 20' fits into upper channel 24 of frame 20 mentioned above. The shells can be locked together in closed position by suitable luggage latches (not shown) on side walls of the shells. A handle 33 may be provided on one of the side walls 18 of shell 12 for carrying the closed case.

In order to fill the interior of each shell 12, 12' and to lock the edge or lip 32 of the cover 30 in place, the following procedure may be followed. First, nest form 25 is preformed by casting, compression molding or other suitable molding method on a form having projections corresponding to the recesses 26 to be formed. The fabric cover 30 will preferably be applied over the molding form prior to forming the nest form. It is possible, however, to preform the plastic nest form and then the fabric cover. The cover should fit neatly and snugly in the recesses 26 and over the top 27 of the nest. The lip 32 will be free and will extend beyond the flange 28 of the nest form.

A suitable quantity of conventional liquid polyurethane P used to make expanded plastic foam is then deposited in the shell 12 or 12' and immediately thereafter the covered nest form 25 is fitted into the top of the shell 12 with the lip 32 extending loosely under the frame 20. In a few seconds after the liquid polyurethane is deposited in the shell 12 and heat is applied, it expands about thirty times in volume and fills the entire interior of shell 12. The expanded cellular plastic foam reaches the underside of the flange 28 and presses the fabric lip 32 of the cover 30 against the bottom edge of the inner wall of frame 20. The expanded foam forms a rather stiff cellular body underlying the nest form filling the shell, impinging against walls 16 and 18 thereof. The expanded foam filling serves to reinforce the shell walls so that thinner material can be used for the shell walls than is customarily used in fitted cases of this kind. Furthermore, the filling reinforces the frame 20, preventing it from bending inwardly of the shell under external pressures.

It will be noted that the fabric cover and nest form are locked in place without use of any glue. The filling 35 is waterproof, odorless, light in weight, and structurally strong. No woodwork is required, in contrast to prior fitted cases which employed wood in the sides of the case and nest form.

The upper shell 12' is filled with foam and fitted with a covered nest form 25' in the same manner as described for shell 12. The foam fillings in the shells of the case thus serve to reinforce and strengthen the shells and frames, to support the nest forms, and to lock the nest forms and covers in place.

Figure 2:
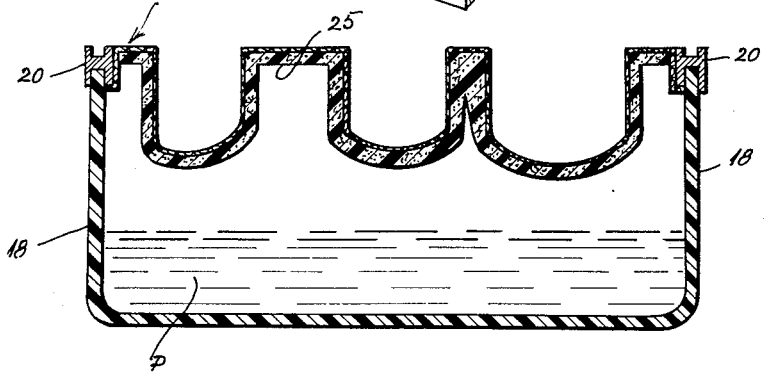
FIG. 2 is a sectional view through a section of the case of FIG. 1 showing one step in the process of manufacture.

In FIG. 2A and FIG. 3 there is illustrated a modification of the invention. The frame 20$^a$ and mating frame 20$^{a'}$ are similar to frames 20 and 20', respectively, except that the inner side 39 or 39' of each frame is extended beyond channel 23 or 23' to form a U-shaped flange 40, 40' on the respective frames. These flanges can be crimped or bent laterally outward against the inner side 39 or 39' to grip the free edge or lip 32$^a$ of the fabric cover 30$^a$. The crimping of the flanges would be performed immediately after each nest form 25$^a$ is inserted into the shell 12$^a$ of case 10$^a$ and before the dense liquid polyurethane has expanded to form filling 35$^a$. Crimping can be accomplished by applying a suitable crimping tool to the inner sides 43 of the recesses 26$^a$ adjacent to the sides and ends of the shell 12$^a$. The expanded filling 35$^a$ engages the inner side of fabric edge 32$^a$ and presses it against side 39 or 39' of the frame to assist the crimped flanges 40, 40' in holding the nest form anchored in the shell.

In FIG. 4, case 10$^b$ has two shells 12$^b$ and 12$^{b'}$ which cooperate to form the complete case. In this case construction, the frames 20$^b$, 20$^{b'}$ are similar in structure to frames 20$^a$ and 20$^{a'}$ with integral flanges 40$^a$, 40$^{a'}$ gripping the edges or lips 32$^b$ of the fabric covers 30$^b$, 30$^{b'}$ on nest forms 25$^b$, 25$^{b'}$. Frames 20$^b$ and 20$^{b'}$ are integrally formed with the walls 18 of the shells 12$^b$ and 12$^{b'}$. The expanded plastic fillings 35$^b$ and 35$^{b'}$ lock the lips 32$^b$ and 32$^{b'}$ of the cloth at the adjacent inner sides 39$^b$, 39$^{b'}$ of the frames. Other parts corresponding to those of cases 10 and 10$^a$ are identically numbered.

In the form of FIGS. 5 and 6, strips 45, 45' have edges 46, 46' inserted into the channels 23$^c$, 23$^{c'}$ of frames 20$^c$, 20$^{c'}$. These strips extend inwardly of the shells 12$^c$, 12$^{c'}$ of case 10$^c$ and are embedded in the expanded foam fillings 35$^c$, 35$^{c'}$. The free lips or edges 32$^c$, 32$^{c'}$ are juxtaposed to the strips 45, 45' and are locked in place along with nest forms 25$^c$, 25$^{c'}$ by the expanded foam fillings. The strips 45, 45' can be made of metal, plastic, fiber or other suitable material.

Figure 7:
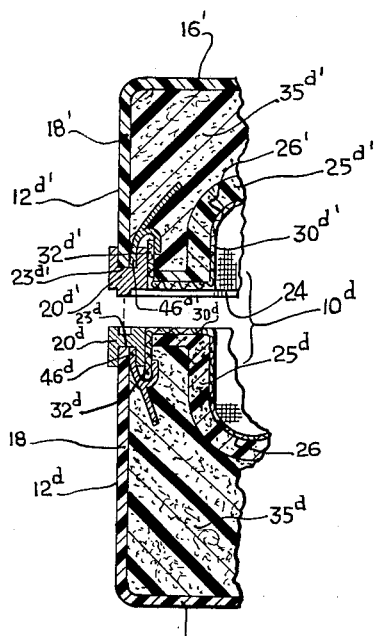
FIG. 7 is a cross-sectional view of parts of a case showing a still further modified form of the invention.
Figure 8:
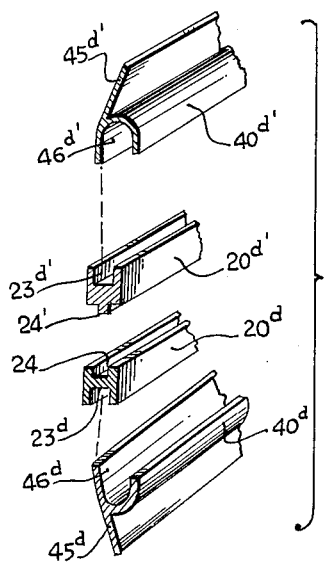
FIG. 8 is an exploded perspective view partially in cross section of a frame and flange insert assembly, employed in the case of FIG. 7.

In the form of FIGS. 7 and 8, the strips 45$^d$, 45$^{d'}$ are formed with laterally extending integral flanges 40$^d$, 40$^{d'}$. These flanges are crimped against lips or edges 32$^d$, 32$^{d'}$ of nest form covers 30$^d$, 30$^{d'}$. The expanded foam plastic fillings 35$^d$, 35$^{d'}$ surround the strips and flanges. The fillings lock the lips of the covers against the inner sides of the frames 20$^d$, 20$^{d'}$ and lock the nest forms 25$^d$, 25$^{d'}$ in the shells 12$^d$, 12$^{d'}$ of case 10$^d$. Edges 46$^d$, 46$^{d'}$ are wedged into channels 23$^d$, 23$^{d'}$ in the frames.

Figure 9:
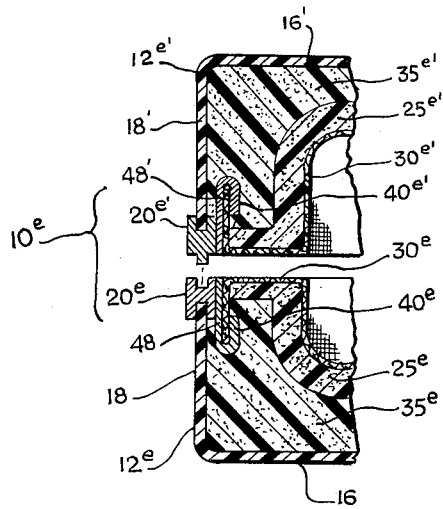
FIG. 9 is a cross-sectional view of parts of a case showing a still further modified form of the invention.
Figure 10:
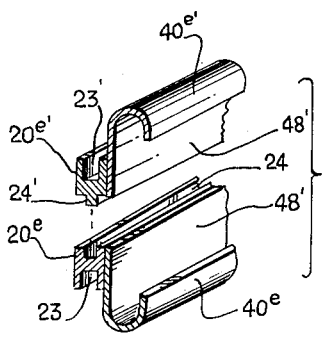
FIG. 10 is an exploded perspective view partially in cross section of frames employed in the case of FIG. 9.

In the form of FIGS. 9 and 10, strips 48, 48' have channel-shaped lateral flanges 40$^e$, 40$^{e'}$. The strips are welded or otherwise secured to the inner sides of frames 20$^e$, 20$^{e'}$. The flanges are bent laterally to the flat parts of the strips to engage edges 32$^e$, 32$^{e'}$ of the nest form covers 30$^e$, 30$^{e'}$. The separate strip and flange structure of FIGS. 9 and 10 may be preferred to the integral flanges 40 and 40' of FIGS. 2A and 3 since it may be desired to form the flanges 40$^e$, 40$^{e'}$ of more pliable material than the frames to which the strips are attached. Other parts of the case 10$^e$ of FIG. 9 which are similar to those of cases 10 and 10$^a$–10$^d$ are identically numbered. The expanded foam plastic fillings 35$^e$, 35$^{e'}$ lock the cover edges 30$^e$, 30$^{e'}$ and nest forms 25$^e$, 25$^{e'}$ in the shells 12$^e$, 12$^{e'}$ as previously explained.

Figure 11:
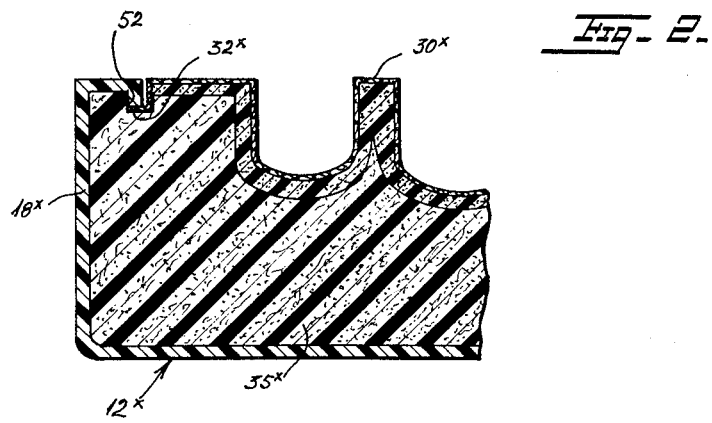
FIG. 11 is a fragmentary cross-sectional view through a case embodying yet another modified form of the invention.

In FIG. 11, a modified form of bottom shell 12$^x$ is shown wherein the edge frame 20 of FIG. 1A is omitted and instead the top edge of the side wall 18$^x$ of the shell is formed with an inwardly extending flange 50, the extremity of which turns inwardly or downwardly as indicated at 52 and coacts with the edge or lip 32$^x$ of the cover 30$^x$ to seal the parts and hold the filling 35$^x$ in place.

The top shell (not shown) will have the bottom edge of its shell flanged with the extremity of the flange extending upwardly instead of downward and coacting with the lip of the cover of the next form of the top shell.

In all forms of the invention, the expanded foam plastic fillings form rigid bodies in the shell bodies of the cases. The fillings are very quickly formed after the unexpanded material is deposited in the shell bodies. The cases are lighter in weight, stronger and more durable than prior cases, less expensive to manufacture, and provide longer and more satisfactory service.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A case of the kind described, comprising a rectangular shell body having bottom, end and side walls with open top, said side walls having a peripheral edge all around the shell body at the open top, a frame on said edge all around the shell body to strengthen said edge, a molded nest plate having recesses in one side for fitting various articles therein, the other side of the nest plate having projections at said other side of the nest plate, a fabric member completely covering said one side of the nest plate, said fabric member having a free lip all around the nest plate and extending away from the other side of the nest plate, said nest plate being disposed in the open top of the shell body with said lip facing an inner side of said frame all around the nest plate, and an expanded foam plastic body filling said shell body, said plastic body abutting and engaging said other side of the nest plate and the projections therefrom, said plastic body pressing laterally outward on said lip of the fabric all around said frame and securing said lip against the inner side of the frame all around the nest plate, whereby the nest plate and cover are locked in place in the top of the shell body on said foam plastic body, and the plastic body is held against displacement, said frame having a flange integral with its inner side crimped to the edge of the lip, the grip of the flange on the lip supplementing the pressure of said plastic foam body on the remainder of the lip all around the nest plate.

2. A case of the kind described, comprising a rectangular shell body having bottom, end and side walls with open top, said side walls having a peripheral edge all around the shell body at the open top, a frame on said edge all around the shell body to strengthen said edge, a molded nest plate having recesses in one side for fitting various articles therein, the other side of the nest plate having projections at said other side of the nest plate, a fabric member completely covering said one side of the nest plate, said fabric member having a free lip all around the nest plate and extending away from the other side of the nest plate, said nest plate being disposed in the open top of the shell body with said lip facing an inner side of said frame all around the nest plate, and an expanded foam plastic body filling said shell body, said plastic body abutting and engaging said other side of the nest plate and the projections therefrom, said plastic body pressing laterally outward on said lip of the fabric all around said frame and securing said lip against the inner side of the frame all around the nest plate, whereby the nest plate and cover are locked in place in the top of the shell body on said foam plastic body, and the plastic body is held against displacement, said frame being integrally formed with the side walls of the shell, said frame having a flange integral with its inner side crimped to the edge of the lip, the grip of the flange on the lip supplementing the pressure of said plastic foam body on the remainder of the lip all around the nest plate.

3. A case of the kind described, comprising a rectangular shell body having bottom, end and side walls with open top, said side walls having a peripheral edge all around the shell body at the open top, a frame on said edge all around the shell body to strengthen said edge, a molded nest plate having recesses in one side for fitting various articles therein, the other side of the nest plate having projections at said other side of the nest plate, a fabric member completely covering said one side of the nest plate, said fabric member having a free lip all around the nest plate and extending away from the other side of the nest plate, said nest plate being disposed in the open top of the shell body with said lip facing an inner side of said frame all around the nest plate, said frame being formed with a channel receiving said peripheral edge of the shell body, a strip having one edge secured in said channel adjacent the peripheral edge of the shell body with the remainder of the strip extending into said shell body, and an expanded foam plastic body filling said shell body, said plastic body abutting and engaging said other side of the nest plate, said remainder of the strip and the edge of said lip being embedded in said plastic body, said plastic body pressing laterally outward on the remainder of said lip all around the nest plate and locking the lip against the inner side of the frame all around the nest plate, whereby the nest plate and cover are locked in place in the top of the shell body on the foam plastic body and the plastic body is held against displacement.

4. A case of the kind described, comprising a rectangular shell body having bottom, end and side walls with open top, said side walls having a peripheral edge all around the shell body at the open top, a frame on said edge all around the shell body to strengthen said edge, a molded nest plate having recesses in one side for receiving various articles therein, the other side of the nest plate having projections at said other side of the nest plate, a fabric member completely covering said one side of the nest plate, said fabric member having a free lip all around the nest plate and extending away from the other side of the nest plate, said nest plate being disposed in the open top of the shell body with said lip facing an inner side of said frame all around the nest plate, a strip having one edge secured to the inner side of the frame, said strip having a flange crimped to the edge of the lip, and an expanded foam plastic body filling said shell body, said plastic body abutting and engaging said other side of the nest plate, said plastic body pressing laterally outward on said flange and on the remainder of said lip and cooperating with said flange in securing said lip in said shell body, whereby the nest plate and cover are locked in place in the top of the shell on said foam plastic body and the plastic body is held against displacement.

5. A case of the kind described, comprising a rectangular shell body having bottom, end and side walls with open top, said side walls having a peripheral edge all around the shell body at the open top, a frame on said edge all around the shell body to strengthen said edge, a molded nest plate having recesses in one side for fitting various articles therein, the other side of the nest plate having projections at said other side of the nest plate, a fabric member completely covering said one side of the nest plate, said fabric member having a free lip all around the nest plate and extending away from the other side of the nest plate, said nest plate being disposed in the open top of the shell body with said lip facing an inner side of said frame all around the nest plate, said frame being formed with a channel receiving said peripheral edge of the shell body, a strip having one edge secured in said channel adjacent the peripheral edge of the shell body, the remainder of the strip extending into said shell body, said strip having a lateral flange crimped to the edge of the lip so that said edge of the lip is gripped between said flange and one side of the strip, and an expanded foam plastic body filling the interior of said shell body, said plastic body abutting and engaging said other side of the nest plate and the projections therefrom, said plastic body pressing laterally outward on the remainder of said lip and holding the same against said one side of the strip, said strip and flange being embedded in said plastic body, whereby the nest plate and cover are locked in place in the top of the shell body on said foam plastic body and the plastic body is held against displacement.

6. A case of the kind described having a pair of similar parts, each of said parts comprising a shell body having bottom, end and side walls with open top, said side walls having a peripheral edge all around the shell body at the open top, a frame on said edge all around the shell body to strengthen said edge, a molded nest plate having recesses in one side for fitting various articles therein, the other side of the nest plate having projections at said other side of the nest plate, a fabric member completely covering said one side of the nest plate, said fabric member having a free lip all around the nest plate and extending away from the other side of the nest plate, said nest plate being disposed in the open top of the shell body with said lip facing an inner side of said frame all around the nest plate, and an expanded foam plastic body filling said shell body, said plastic body abutting and engaging said other side of the nest plate and the projections therefrom, said plastic body pressing laterally outward on said lip of the fabric all around said frame and securing said lip against the inner side of the frame all around the nest plate, whereby the nest plate and cover are locked in place in the top of the shell body on said foam plastic body, and the plastic body is held against displacement, the frame on one of the shell bodies having a channel all around the frame, the frame on the other shell body having a ridge all around the frame for fitting into said channel, and hinge means pivotally securing the shell bodies together so that the nest plate and cover of one shell body will face the nest plate and cover of the other shell body when the ridge of the frame on the other shell body is fitted into the channel in the frame of said one shell body.

7. A case of the kind described having a pair of similar parts, each of said parts comprising a shell body having bottom, end and side walls with open top, said side walls having a peripheral edge all around the shell body at the open top, a frame on said edge all around the shell body to strengthen said edge, a molded nest plate having recesses in one side for fitting various articles therein, the other side of the nest plate having projections at said other side of the nest plate, a fabric member completely covering said one side of the nest plate, said fabric member having a free lip all around the nest plate and extending away from the other side of the nest plate, said nest plate being disposed in the open top of the shell body with said lip facing an inner side of said frame all around the nest plate, and an expanded foam plastic body filling said shell body, said plastic body abutting and engaging said other side of the nest plate and the projections therefrom, said plastic body pressing laterally outward of said lip of the fabric all around said frame and securing said lip against the inner side of the frame all around the nest plate, whereby the nest plate and cover are locked in place in the top of the shell body on said foam plastic body, and the plastic body is held against displacement, the frame on one of the shell bodies having a channel all around the frame, the frame on the other shell body having a ridge all around the frame for fitting into said channel, and hinge means pivotally securing the shell bodies together so that the nest plate and cover of one shell body will face the nest plate and cover of the other shell body when the ridge of the frame on the other shell body is fitted into the channel in the frame of said one shell body, the frame on each shell body being integral with the walls of the shell body.

8. A case of the kind described having a pair of similar parts, each of said parts comprising a shell body having bottom, end and side walls with open top, said side walls having a peripheral edge all around the shell body at the open top, a frame on said edge all around the shell body to strengthen said edge, a molded nest plate having recesses in one side for fitting various articles therein, the other side of the nest plate having projections at said other side of the nest plate, a fabric member completely covering said one side of the nest plate, said fabric member having a free lip all around the nest plate and extending away from the other side of the nest plate, said nest plate being disposed in the open top of the shell body with said lip facing an inner side of said frame all around the nest plate, and an expanded foam plastic body filling said shell body, said plastic body abutting and engaging said other side of the nest plate and the projections therefrom, said plastic body pressing laterally outward on said lip of the fabric all around said frame and securing said lip against the inner side of the frame all around the nest plate, whereby the nest plate and cover are locked in place in the top of the shell body on said foam plastic body, and the plastic body is held against displacement, said frame having a flange integral with its inner side crimped to the edge of the lip, the grip of the flange on the lip supplementing the pressure of said plastic foam body on the remainder of the lip all around the nest plate, the frame on one of the shell bodies having a channel all around the frame, the frame on the other shell body having a ridge all around the frame for fitting into said channel, and hinge means pivotally securing the shell bodies together so that the nest plate and cover of one shell body will face the nest plate and cover of the other shell body when the ridge of the frame on the other shell body is fitted into the channel in the frame of said one shell body.

References Cited by the Examiner
UNITED STATES PATENTS

| | | | |
|---|---|---|---|
| 1,770,534 | 7/30 | Shields | 206—75 |
| 1,781,779 | 11/30 | Farrington | 206—75 |
| 2,282,908 | 5/42 | Thompson | 206—1 |
| 2,620,919 | 12/52 | Passmore | 206—1 |
| 2,971,640 | 2/60 | Snelling | 217—35 |
| 3,120,570 | 2/64 | Kennedy et al. | 264—45 |
| 3,137,744 | 6/64 | Burrus | 264—45 |

THERON E. CONDON, *Primary Examiner.*